(12) United States Patent
Englert et al.

(10) Patent No.: US 9,680,605 B2
(45) Date of Patent: Jun. 13, 2017

(54) METHOD OF OFFLOADING CYCLIC REDUNDANCY CHECK ON PORTIONS OF A PACKET

(71) Applicants: Eric Englert, Ottawa (CA); Bernard Marchand, Cantley (CA); John F. Pillar, Ottawa (CA)

(72) Inventors: Eric Englert, Ottawa (CA); Bernard Marchand, Cantley (CA); John F. Pillar, Ottawa (CA)

(73) Assignee: NXP USA, Inc., Austin, TX (US)

( * ) Notice: Subject to any disclaimer, the term of this patent is extended or adjusted under 35 U.S.C. 154(b) by 82 days.

(21) Appl. No.: 14/713,632

(22) Filed: May 15, 2015

(65) Prior Publication Data

US 2016/0337083 A1    Nov. 17, 2016

(51) Int. Cl.
*H03M 13/00* (2006.01)
*H04L 1/00* (2006.01)

(52) U.S. Cl.
CPC ................ *H04L 1/0061* (2013.01)

(58) Field of Classification Search
None
See application file for complete search history.

(56) References Cited

U.S. PATENT DOCUMENTS

| | | | |
|---|---|---|---|
| 5,777,986 A * | 7/1998 | Grossman | H04L 12/5602 370/235 |
| 5,878,057 A * | 3/1999 | Maa | H03M 13/6575 714/757 |
| 6,201,755 B1 | 3/2001 | Pillar et al. | |
| 6,434,114 B1 * | 8/2002 | Jain | H04Q 3/0029 370/230 |
| 6,640,327 B1 * | 10/2003 | Hallberg | H03M 13/152 714/758 |
| 6,961,893 B1 | 11/2005 | Mukund et al. | |
| 7,219,255 B2 * | 5/2007 | Khalil | G05B 9/03 714/11 |
| 7,458,006 B2 * | 11/2008 | Cavanna | H03M 13/091 714/757 |
| 7,681,102 B2 * | 3/2010 | Sonksen | G06F 11/10 714/6.12 |
| 8,352,829 B1 | 1/2013 | Pathakota | |
| 9,256,491 B1 * | 2/2016 | Dropps | G06F 11/1048 |
| 2008/0201689 A1 | 8/2008 | Lin | |

OTHER PUBLICATIONS

Freescale Semiconductor, Inc., Layerscape Architecture a Look Inside the Next-Generation QorIQ LS Series SoCs, 2013.

* cited by examiner

*Primary Examiner* — Daniel McMahon

(57) ABSTRACT

A method and apparatus are provided for computing a CRC value for a data stream packet with a modified portion and an unmodified portion extending a distance to the end of the data stream packet by computing a first CRC value from the unmodified portion, computing a second CRC value from the modified portion, adjusting the second CRC value based on a shift length equal to the distance of the unmodified portion to compute a perspective shifted second CRC value by using a fixed number of distance lookup table operations, and generating an updated CRC value from the first CRC value and perspective shifted second CRC value, thereby avoiding recalculating a complete CRC value based on an entirety of the data stream packet.

20 Claims, 4 Drawing Sheets

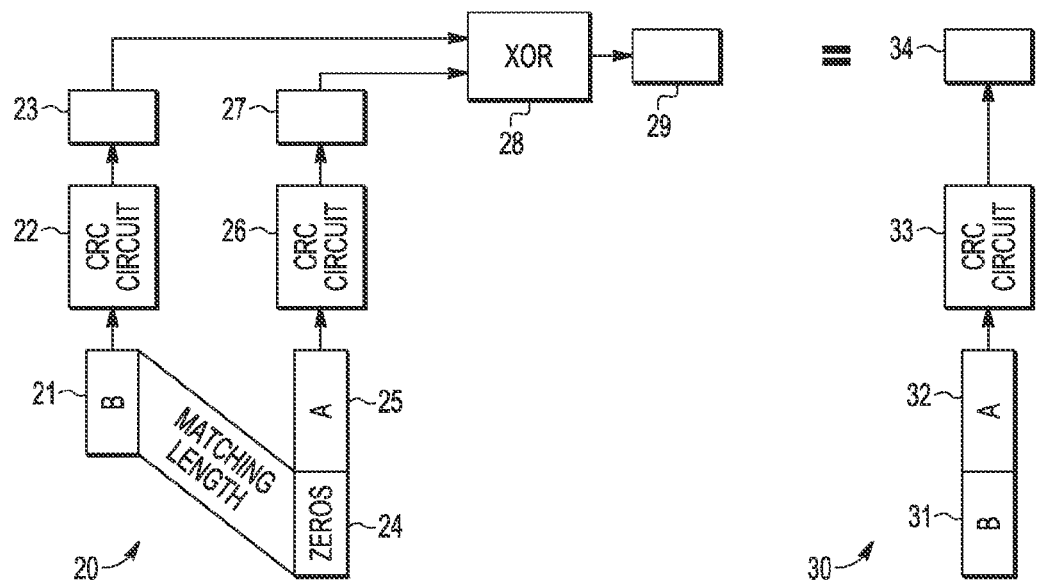
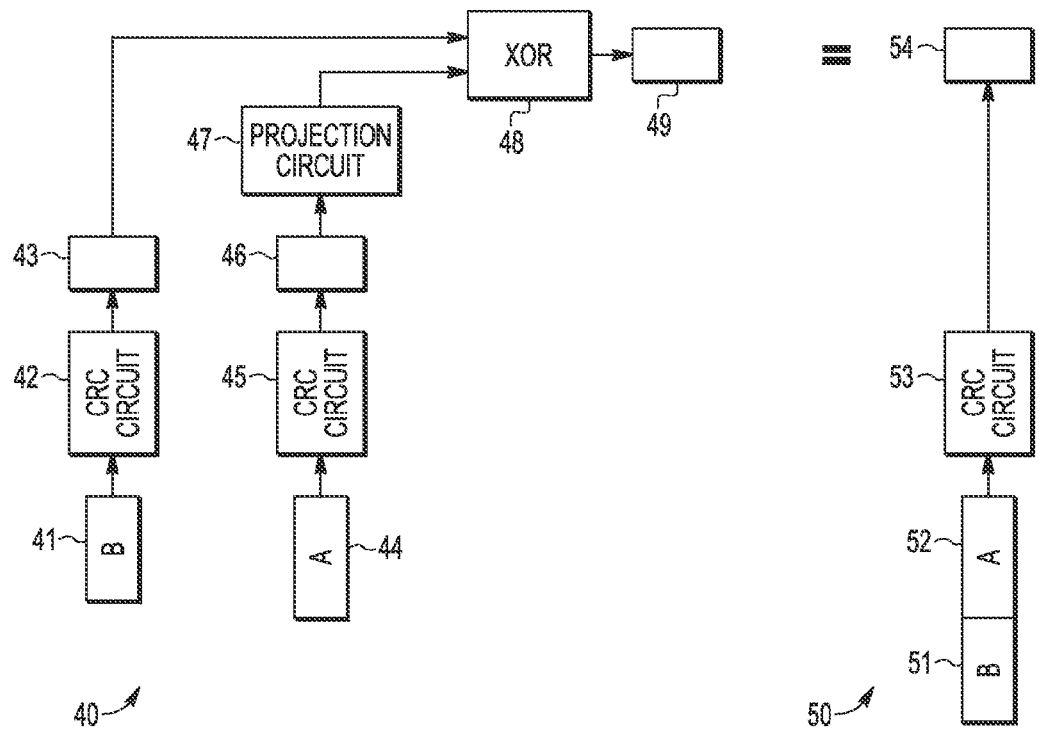
FIG. 2
FIG. 3

METHOD OF OFFLOADING CYCLIC REDUNDANCY CHECK ON PORTIONS OF A PACKET

BACKGROUND OF THE INVENTION

Field of the Invention

The present invention is directed in general to error detection and correction techniques used to verify data integrity between two nodes in a communications network. In one aspect, the present invention relates to determining checksums, such as cyclic redundancy check (CRC) codes.

Description of the Related Art

In data processing systems, data communicated from a source node to a destination node should be received accurately. To this end, error detection and correction (or error control) techniques are provided to enable reliable delivery of digital data between nodes. For example, a cyclic redundancy check (CRC) is an error-detecting code commonly used in digital networks and storage devices to detect changes to transmitted blocks of data by using a predetermined algorithm to compute a CRC sum at the transmitting/source node that is appended to data being transmitted. CRC sums are typically a check (data verification) value that is computed as a redundancy (e.g., it expands the message without adding information) using an algorithm based on cyclic codes, such as by computing the remainder of a polynomial division of the data block contents being transmitted. At the receiving/destination node, the received CRC sum can be compared to a similar CRC sum computed from the received data blocks. If the two CRC sums are identical, the transmitted data is presumed correct, but if the generated CRC sums do not match, an error is indicated, possibly along with corrective action against the presumed data corruption.

CRC sums may be computed in different ways with different applications. For example, CRC calculations can be performed in either hardware or software. To implement a CRC calculation in hardware, a dedicated hardware engine is typically provided within the system to perform the CRC calculation by sending the data to be subjected to such a CRC calculation to the hardware engine for calculation of the CRC, which is then appended to the data, e.g., for transmission from the system. Various drawbacks exist to using such an offload engine, including the overhead of sending data to the engine. Furthermore, it is difficult to perform a stateless hardware offload. That is, typically additional state-based overhead data also needs to be transmitted, increasing complexity and slowing the progress of useful work. In other applications. CRC calculations may be performed in software, typically by using lookup table schemes. However, such software calculations of CRC values are notoriously slow, computationally intensive, and memory hogs, impacting cost, degrading network performance, and consuming processing and memory resources to such an extent that software-based CRC calculation may not be suitable for general use in high-speed networks. With both hardware and software solutions, there are challenges with providing an efficient mechanism for recalculating an existing CRC sum when a portion of data within a data block is removed or altered without requiring the recalculation of the CRC sum over the entire data block. As a result, the existing solutions for efficiently and flexibly calculating CRC sums to enable reliable data delivery are extremely difficult at a practical level.

BRIEF DESCRIPTION OF THE DRAWINGS

The present invention may be understood, and its numerous objects, features and advantages obtained, when the following detailed description is considered in conjunction with the following drawings.

FIG. 2 illustrates a simplified block diagram of a CRC circuit for performing out of order piecewise processing of partial CRC values by padding one of the partial CRC values with trailing zeroes.

FIG. 3 illustrates a simplified block diagram of a CRC circuit for performing out of order piecewise processing of partial CRC values by employing a projection circuit to adjust the perspective of one of the computed partial CRC values in accordance with selected embodiments of the present disclosure.

DETAILED DESCRIPTION

Figure 1:
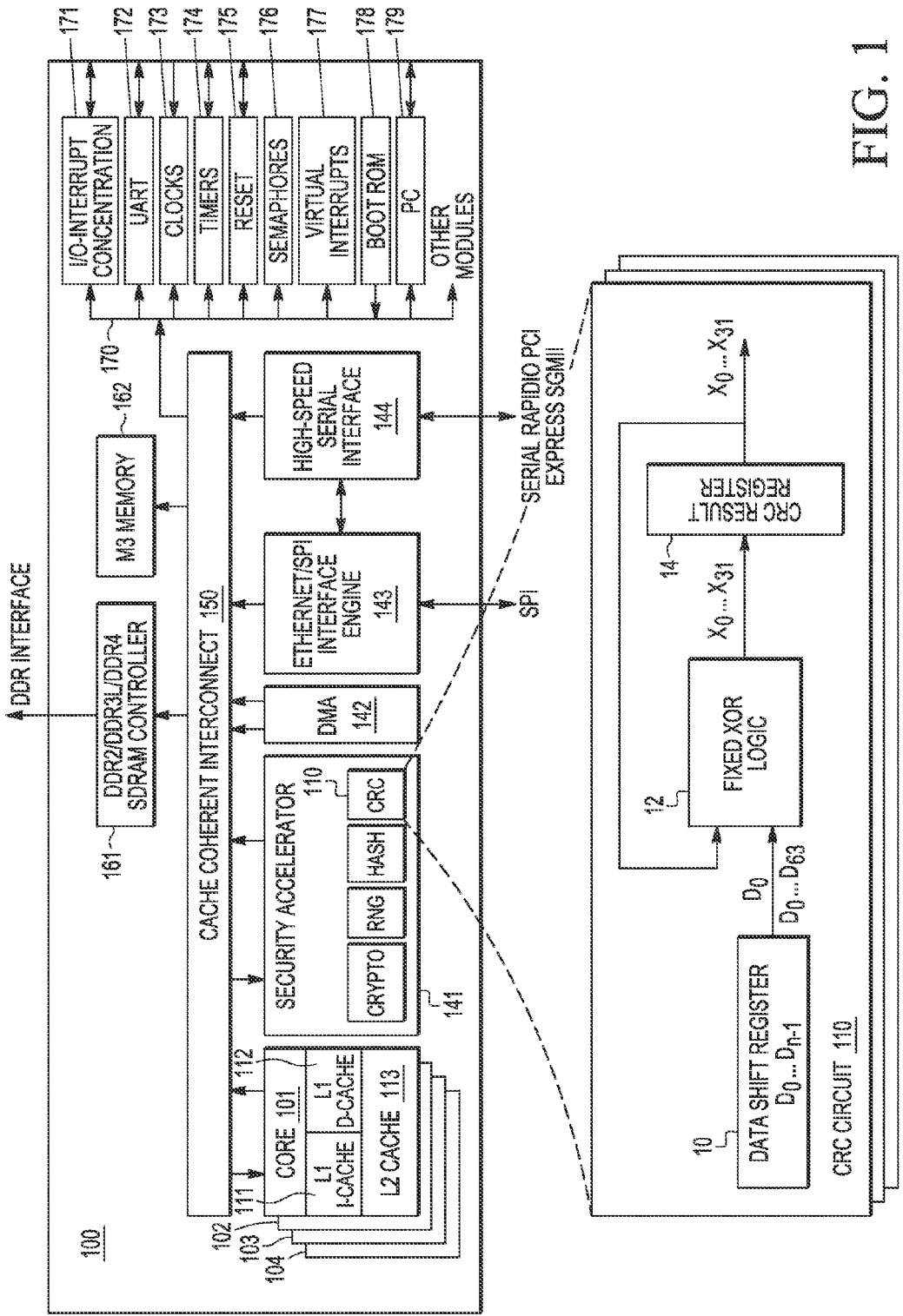
FIG. 1 illustrates a simplified schematic diagram of a communications processor chip having multiple processor cores and dedicated security accelerator hardware engine for offloading CRC computations on portions of a data packet in accordance with selected embodiments of the invention.

A method and apparatus are described for offloading cyclic redundancy check computations on data packet portions to address various problems in the art where various limitations and disadvantages of conventional solutions and technologies will become apparent to one of skill in the art after reviewing the remainder of the present application with reference to the drawings and detailed description provided herein. In selected embodiments, a CRC hardware mechanism and methodology are provided for recalculating a CRC value for a data stream packet when a portion of the data stream packet is removed or altered without requiring recalculation of the CRC value over the entire data stream packet by transforming a computed CRC value to provide a perspective adjustment or projection to simulate the effective CRC contribution of the removed/adjusted data stream packet portion. The disclosed CRC hardware mechanism uses the position of the data stream packet portion (e.g., the length of any trailing portion(s) of the data stream) to access one or more distance lookup tables to provide a transformation of the CRC value that corresponds to the computational result of appending a specified number of zeroes (corresponding to the position of the packet portion in the data stream) to the computed CRC value and then applying the computed CRC value to a CRC circuit as an initial value to continue the CRC calculation over the specified number of zeroes to thereby compute a second CRC value.

In operation, a CRC value may be computed for the adjusted data stream packet portion and then projected to alter the perspective of the removed/adjusted data stream packet portion by applying the computed CRC value to the CRC projection or perspective adjustment circuit which uses a term enable matrix generation lookup table containing all possible projections for a given polynomial to perform a single lookup to resolve the projection. When embodied with a term enable matrix generation lookup table which includes a corresponding entry for every possible distance, the projection of the computed CRC value (e.g., the CRC multiplier) can be resolved in a single cycle. However, since the table entries are based on the distance projected, the lookup table memory can be divided in binary divisions to allow for multiple lookups in smaller memories over more cycles.

As will be appreciated, the computation of projected CRC values from a data stream packet may be performed in any desired or piecewise order using one or more cycles, depending on the application requirements in terms of cost, memory, and performance requirements. By using a CRC projection or perspective adjustment circuit to perform piecewise computation of a bulk CRC over the entire data stream packet as it is received from a physical network interface and copied into memory, subsequent parsing of the data stream packet by hardware can remove portions not covered by the CRC from the bulk CRC. When the parser gets to the portion covering the CRC, the updated bulk CRC would be used to validate the CRC contained in the target PDU header. This enables high data rates and deterministic performance along with superior performance per watt when supporting internet protocols, such as Internet Small Computer System Interface (iSCSI).

Referring now to FIG. 1, there is shown a simplified schematic diagram of a communications processor chip 100 having multiple processor cores 101-104. As illustrated, each of the processor cores (e.g., 101) is coupled to one or more levels of cache memory, such as an L1 instruction cache 111, L1 data cache 112, and/or L2 cache 113. To offload selected security computations from the processor cores 101-104, the depicted multi-core SoC 100 also includes a security accelerator engine 141 which includes dedicated hardware units for supporting cryptographic hardware acceleration (CRYPTO), a true random number generator (RNG), hashing (HASH), and CRC hardware unit 110 for offloading CRC computations on portions of a data packet in accordance with selected embodiments of the invention. Each processor core is coupled across an interconnect bus 150 to one or more memory controllers 161, which are coupled in turn to one or more banks of system memory (not shown). The interconnect bus 150 also couples the processor cores to a Direct Memory Access (DMA) controller 142, network interface 143, a high speed serial interface 144, and to other hardware devices 171-179.

Each processor core 101-104 may be configured to execute instructions and to process data according to a particular instruction set architecture (ISA), such as x86, PowerPC, SPARC, MIPS, and ARM, for example. In a selected embodiment, a highly suitable example of a processor design for the processor core is an ARM v7 Cortex-A7 32-bit core that runs at 1 GHz. Those of ordinary skill in the art also understand the present invention is not limited to any particular manufacturer's microprocessor design. The processor core may be found in many forms including, for example, any 32-bit or 64-bit microprocessor manufactured by Freescale, Motorola, Intel, AMD, Sun or IBM. However, any other suitable single or multiple microprocessors, microcontrollers, or microcomputers may be utilized. In the illustrated embodiment, each processor core 101-104 may be configured to operate independently of the others, such that all cores may execute in parallel. In some embodiments, each of cores may be configured to execute multiple threads concurrently, where a given thread may include a set of instructions that may execute independently of instructions from another thread. Such a core may also be referred to as a multithreaded (MT) core. Thus, a single multi-core SoC 100 with two cores will be capable of executing a multiple of two threads in this configuration. However, it should be appreciated that the invention is not limited to two processor cores and that more or fewer cores can be included. In addition, the term "core" refers to any combination of hardware, software, and firmware typically configured to provide a processing functionality with respect to information obtained from or provided to associated circuitry and/or modules (e.g., one or more peripherals, as described below). Such cores include, for example, digital signal processors (DSPs), central processing units (CPUs), microprocessors, and the like. These cores are often also referred to as masters, in that they often act as a bus master with respect to any associated peripherals. Furthermore, the term multi-core (or multi-master) refers to any combination of hardware, software, and firmware that that includes two or more such cores, regardless of whether the individual cores are fabricated monolithically (i.e., on the same chip) or separately. Thus, a second core may be the same physical core as first core, but has multiple modes of operation (i.e., a core may be virtualized).

As depicted, each processor core (e.g., 101) may include a first level (L1) cache which includes an instruction cache (icache) 111 and a data cache (dcache) 112. In addition, a second level of cache memory (L2) 113 may also be provided at each core, though the L2 cache memory can also be a single L2 cache memory which is shared by one or more processor cores. The processor core 101 executes instructions and processes data under control of the operating system (OS) which may designate or select the processor core 101 as the control or master node for controlling the workload distribution amongst the processor cores 102-104. Communication between the cores 101-104 may be over the interconnect bus 150 or over a crossbar switch and appropriate dual point to point links according to, for example, a split-transaction bus protocol such as the HyperTransport (HT) protocol (not shown).

The processor cores 101-104, security accelerator 141, and other integrated device units communicate over the interconnect bus 150 which manages data flow between the cores and device units. The interconnect bus 150 may be configured to concurrently accommodate a large number of independent accesses that are processed on each clock cycle, and enables communication data requests from the processor cores 101-104 to external system memory and/or M3 memory 162, as well as data responses therefrom. In selected embodiments, the interconnect bus 150 may include logic (such as multiplexers or a switch fabric, for example) that allows any core to access any bank of memory, and that conversely allows data to be returned from any memory bank to any core. The interconnect bus 150 may also include logic to queue data requests and/or responses, such that requests and responses may not block other activity while waiting for service. Additionally, the interconnect bus 150 may be configured as a chip-level arbitration and switching system (CLASS) to arbitrate conflicts that may occur when multiple cores attempt to access a memory or vice versa.

The interconnect bus 150 is in communication with main memory controller 161 to provide access to the M3 memory 162 or main memory (not shown). Memory controller 161 may be configured to manage the transfer of data between the multi-core SoC 100 and system memory, for example. In some embodiments, multiple instances of memory controller 161 may be implemented, with each instance configured to control a respective bank of system memory. Memory controller 161 may be configured to interface to any suitable type of system memory, such as Double Data Rate or Double Data Rate 2 or Double Data Rate 3 Synchronous Dynamic Random Access Memory (DDR/DDR2/DDR3L/DDR4 SDRAM), or Rambus DRAM (RDRAM), for example. In some embodiments, memory controller 161 may be configured to support interfacing to multiple different types of system memory. In addition, the Direct Memory Access (DMA) controller 142 may be provided which controls the direct data transfers to and from system memory via memory controller 161.

As will be appreciated, the multi-core SoC 100 may be configured to receive data from sources other than system memory. To this end, a network interface engine 143 may be configured to provide a central interface for handling Ethernet and SPI interfaces, thus off-loading the tasks from the cores. In addition, a high speed serial interface 144 may be configured to support one or more serial RapidIO ports, a PCI-Express Controller, and/or a serial Gigabit Media Independent Interface (SGMII). In addition, one or more interfaces 170 may be provided which are configured to couple the cores to external boot and/or service devices, such as I/O interrupt concentrators 171, UART device(s) 172, clock(s) 173, timer(s) 174, reset 175, hardware semaphore(s) 176, virtual interrupt(s) 177, Boot ROM 178, 12C interface 179, GPIO ports, and/or other modules.

In selected embodiments, the SoC communications processor chip 100 may be embodied as an intermediate network device positioned between a source node or device and a destination node or device. In this position, the SoC communications processor chip 100 may modify a packet transmitted from the source device to the destination device, such as when providing a router and data forwarding function or an intrusion prevention function. In such cases, the SoC communications processor chip 100 may modify information within a packet using the techniques disclosed herein to efficiently calculate an updated CRC in a manner that avoids a complete CRC re-computation based on the entire packet after only a portion of a packet (e.g., a portion of the packet header) has been modified. For example, a router functionality may be enabled by apply the CRC calculation techniques described herein when modifying an MPLS label stack of the packet or when modifying any information within the packet header (e.g., when operating as a proxy for a destination of the packet). In addition, a service plane of a router may apply the disclosed CRC calculation techniques when applying security services to packet flow.

By providing each processor core 101-104 with access to a dedicated CRC circuit 110 as part of the security accelerator unit 141, the SoC communications processor chip 100 can receive inbound packets at the network interface engine 143 and/or high speed serial interface 144, and perform operations that result in modification to one or more portions of the packets, such as by modifying the packet in the event that portions of the packet's payload are suspicious, by altering a header of the packet to redirect the packet or operate as a proxy for the packet's destination, by altering an MPLS label stack so as to forward the packet in a MPLS network, or otherwise apply any operation that modifies portions of the header and/or the payload of the packet. When a packet modification requires a CRC re-computation based on any changes to a given packet, the CRC circuit 110 re-computes the CRC of the packet as described herein, reassembles the packet if CRC re-computation was performed, and sends the modified version of the inbound packet out a network link through the network interface engine 143 and/or high speed serial interface 144. By applying the efficient CRC regeneration techniques described herein without requiring complete CRC re-computation, the SoC communications processor chip 100 may reduce the number of clock cycles, power consumption, and interconnect access operations that oftentimes accompany the traditional method of reading the entire inbound packet and re-computing the CRC, including the unchanged portions of the data packet.

As shown, CRC circuit 110 includes an input data shift register 10, fixed XOR logic block 12, and a multi-bit CRC result register 14 which may be connected to provide a serial or parallel hardware circuit to facilitate out-of-order piecewise CRC calculations over strings of data provided to the CRC circuit 110. When embodied as a serial CRC circuit 110 for calculating a 32-bit CRC value $X_0 \ldots X_{31}$, the CRC circuit 110 is connected to receive and store a string of data $(D_0 \ldots D_{n-1})$ at the input data shift register 10 and calculate therefrom a 32-bit CRC by sequentially supplying 1 data bit (e.g., $D_0$) per cycle to the fixed XOR logic block 12 which includes "Exclusive OR" gates (XOR gates) for fixed polynomials to generate the multi-bit CRC output string x= $(x_0 \ldots x_{31})$. Stated generally, the form of the logic in the XOR logic block 12 is:

$$x_{31} = a_{31} \& X_{31} \oplus X_{30}$$
$$x_{30} = a_{30} \& X_{31} \oplus X_{29}$$
$$\ldots$$
$$x_1 = a_1 \& X_{31} \oplus X_0$$
$$x_0 = a_0 \& X_{31} \oplus D_0$$

where "a" is a vector of length 32 ($a_0, a_1 \ldots a_{31}$) of single bit constants (values 1 or 0) for a given "generating polynomial." For a circuit that supports only a fixed polynomial, the logic consists of only of XOR gates since "ANDing" with a constant 1 or 0 simply devolves to a term being present or not in the equation. The generated output from the fixed XOR logic block 12 is held in the multi-bit CRC result register 14 and sequentially clocked to generate the output vector $X=(X_0 \ldots X_{31})$ which is fed back as an input to the fixed XOR logic block 12, to hold the final result (intermediate results prior to completion) and logic function consisting solely of "Exclusive Or" gates (XOR gates) for fixed polynomials. To calculate the CRC over n bits of data with the serial CRC circuit 110 requires n cycles.

When embodied as a parallel CRC circuit 110 for calculating a 32-bit CRC value $X_0 \ldots X_{31}$, a plurality of k bits (e.g., $D_0 \ldots D_{63}$) from the string of data at the input data shift register 10 are connected in parallel for input to the fixed XOR logic block 12 which is configured to calculate the contribution of k bits to a 32-bit CRC 64 data bits per cycle. Although referred to as a "parallel CRC" because words of k bits are presented in parallel, persons skilled in the art will appreciate that words of k bits within the n bits are present over multiple cycles and the net result is "as if" the calculation were done serially bit by bit. The received plurality of k bits (e.g., $D_0 \ldots D_{63}$) are applied to the fixed XOR logic block 12 which includes XOR gates for fixed polynomials to generate the multi-bit CRC output string $x=(x_0 \ldots x_{31})$. In the parallel CRC circuit embodiment, the general form of the logic in the XOR logic block 12 is:

$$x_{31} = a_{31\_31} \& X_{31} \oplus a_{31\_30} \& X_{30} \oplus \ldots \oplus a_{31\_0} \& X_0 \oplus b_{31\_0} \& D_0 \oplus \ldots \oplus b_{31\_63} \& D_{63}$$

$$x_{30} = a_{30\_31} \& X_{31} \oplus a_{30\_30} \& X_{30} \oplus \ldots \oplus a_{30\_0} \& X_0 \oplus b_{30\_0} \& D_0 \oplus \ldots \oplus b_{30\_63} \& D_{63}$$

$$\ldots$$

$$x_1 = a_{1\_31} \& X_{31} \oplus a_{1\_30} \& X_{30} \oplus \ldots \oplus a_{1\_0} \& X_0 \oplus b_{1\_0} \& D_0 \oplus \ldots \oplus b_{1\_63} \& D_{63}$$

$$x_0 = a_{0\_31} \& X_{31} \oplus a_{0\_30} \& X_{30} \oplus \ldots \oplus a_{0\_0} \& X_0 \oplus b_{0\_0} \& D_0 \oplus \ldots \oplus b_{0\_63} \& D_{63}$$

where "a" and "b" are, respectively, matrices of dimensions 32×32 and 32×64 of single bit constants (values 1 or 0) for a given "generating polynomial" and given value of k=64. The matrices of constants "a"=$[a_{31:0,31:0}]$ and "b"= $[b_{31:0,31:0}]$ can be determined by modeling the basic serial circuit with appropriate polynomial and then simulating the effect of 64 shifts. The simulation only needs to employ simple algebraic substitution and simplified using the fact that any value XOR'ed with itself is zero. For a circuit that supports only a fixed polynomial, the logic consists of only of XOR gates since "ANDing" with a constant 1 or 0 simply devolves to a term being present or not in the equation. To calculate the CRC over n bits of data with the parallel CRC circuit 110 requires n/k cycles.

In selected embodiments, the CRC circuit 110 may be used to perform in-order piecewise CRC calculations for a string of data ($D_0 \ldots D_{n-1}$) received at the input data shift register 10. For example, it may be required in some applications to calculate a CRC over a unit of data where the data is received at the communications processor chip 100 in pieces that are interleaved by different units into the input data shift register 10. If the pieces are received in order, either the serial or parallel embodiments of the CRC circuit 110 may be used. In operation, a selected piece or portion of data may be processed by first preloading the partial CRC of the previous pieces from the context into the CRC result register 14, and then applying the selected piece of data from the data shift register 10 in the usual manner. If a selected piece of does not complete the full CRC value, then the resulting partial CRC value must be stored into context (e.g., M3 memory 163) for completion later. As will be appreciated, such in-order piecewise calculation using the CRC circuit 110 is substantially as efficient as performing a contiguous CRC calculation, albeit with some speed degradation and latency resulting from loading and/or storing partial CRC results.

In other embodiments, the CRC circuit 110 may be used to perform out-of-order piecewise CRC calculations for a string of data ($D_0 \ldots D_{n-1}$) where the data is received at the communications processor chip 100 in pieces that are received out of order. There are a variety of approaches for performing out-of-order piecewise CRC calculations. One approach is to use the CRC circuit 110 to implement a "reassemble and replay" approach whereby the pieces of data are stored by the system as received, and once all pieces from a string of data or unit are received, the complete unit is retrieved from storage, reassembled in the input data shift register 10, and passed to the CRC circuit 110. Although the CRC circuit 110 is used efficiently with this "reassemble and replay" approach, the system performance degrades due to the additional step of retrieving the data, resulting in significant processing degradations.

Another approach for performing out-of-order piecewise CRC calculations is to implement a "pad and XOR" approach for logically combining partial CRC values derived from different data pieces. This approach is derived from the following observations about the CRC circuit 110. First, the feedback value ($X_0 \ldots X_{31}$) to the fixed XOR logic block 12 at any cycle represents the CRC of the data processed so far. Second, the feedback value ($X_0 \ldots X_{31}$) and the string of data ($D_0 \ldots D_{n-1}$) are combined with the XOR operation which is a both "linear" and "commutative." Finally, the addition of zeroes post-pended to a string of data or unit have no effect on a CRC result apart from augmenting its temporal position in the original data stream. To illustrate this "pad and XOR" approach, reference is now made to FIG. 2 which illustrates a simplified block diagram of equivalent CRC circuit configurations 20, 30 for computing CRC values from data string pieces A, B.

In the first CRC circuit configuration 20, a CRC calculation from a data stream or unit "D" consisting of pieces "A" concatenated with "B" (e.g., D=AB) may be computed when the pieces are received out of order (e.g., "B" before "A"). As a first step, the second data piece "B" 21 is received first (e.g., out of order) and applied to a CRC circuit 22 which calculates the second partial CRC value over "B" for storage in a storage, memory, or buffer 23. Subsequently, the first data piece "A" 25 is received and padded with a string of trailing zeroes 24 which matches the length of a second data piece "B" 21. The zero-padded first data piece 24, 25 is then applied to a CRC circuit 26 which calculates the first partial CRC value over the zero-padded first data piece 24, 25 for storage in a storage, memory, or buffer 27. (As will be appreciated, the CRC circuits 22, 26 may each embody the CRC circuit 110 shown in FIG. 1.) Thereafter, the first and second partial CRC values are retrieved and logically combined with the XOR circuit module 28 to calculate the CRC over the unit of data "D" for storage in a storage, memory, or buffer 29.

For comparison purposes, the second CRC circuit configuration 30 embodies a CRC calculation from a data stream or unit "D" consisting of contiguous pieces "A" 32 and "B" 31 applied to a CRC circuit 33 which calculates the CRC value over the data stream or unit "D" for storage in a storage, memory, or buffer 34. The CRC computational results 29, 34 for the CRC circuit configurations 20, 30 are identical, and can be accomplished without requiring data retrieval from external memory. However, with the first CRC circuit configuration 20, the CRC circuit 26 is used for addition cycles while the padded zeroes 24 are processed in order to adjust the first partial CRC computation over the zero-padded first data piece 24, 25 to the same "perspective" as the second partial CRC value over "B" 21. In cases where the CRC circuit 26 sits on the datapath (e.g., interconnect 150), this effectively ties up the datapath. In addition, the number of wasted cycles increases if a unit of a given size were divided into more pieces of smaller size(s).

Another approach for performing out-of-order piecewise CRC calculations would be to treat the calculation of the first partial CRC value over the zero-padded first data piece 24, 25 as an in-order CRC calculation of two pieces of "A" and "zeroes." As such, the CRC of data piece "A" after being computed by a primary CRC circuit on the datapath could be passed as an initial input value to a secondary CRC circuit to continue the CRC calculation over the given number of zeros. This approach would provide some performance benefit by effectively pipelining the CRC task between two CRC circuits to reduce the amount of time the primary and secondary CRC circuits are tied up. However, since the task of the secondary CRC circuit is to transform a CRC value by virtue of applying the appended string of zeroes, there is no need to supply variable data into the secondary CRC circuit's calculation. As a result, the CRC calculation performed by the secondary CRC circuit transforms the initial input value (namely, the CRC of data piece "A") in a predictable, linear, and reversible way that is suitable for implementation with a lookup table solution. By way of analogy, the transformation performed by the secondary CRC circuit corresponds to a perspective shift of how an object appears as a viewer moves to a new perspective. For this reason, the task or functionality of the secondary CRC circuit is to "adjust the perspective" of a CRC value rather that calculate a CRC over variable data, and may be implemented with appropriate CRC projection circuitry which uses one or more lookup tables containing all the possible projections for a given polynomial so that a forward projection of a computed CRC value can be resolved to adjust the perspective of the CRC value with a small and fixed number of cycles, thereby providing significant performance benefits.

To illustrate selected embodiments of a method and apparatus for offloading cyclic redundancy check computations on data packet portions by adjusting the perspective of a partial CRC value, reference is now made to FIG. 3 which illustrates a simplified block diagram of equivalent CRC circuit configurations 40, 50 for computing CRC values from data string pieces A, B. In the first CRC circuit configuration 40, a CRC calculation from a data stream or unit "D" consisting of pieces "A" concatenated with "B" (e.g., D=AB) may be computed when the pieces are received out of order (e.g., "B" before "A"). As a first step, the second data piece "B" 41 is received first (e.g., out of order) and applied to a CRC circuit 42 which calculates the second partial CRC value over "B" for storage in a storage, memory, or buffer 43. Subsequently, the first data piece "A" 44 is received and applied (without zero padding) to a CRC circuit 45 which calculates the first partial CRC value over "A" for storage in a storage, memory, or buffer 46. (As will be appreciated, the CRC circuits 42, 45 may each embody the CRC circuit 110 shown in FIG. 1.) Instead of zero-padding the first data piece 44, the calculated first partial CRC value from the storage, memory, or buffer 46 is supplied to the projection circuit 47 along with an indication of the length of the second data piece "B" 41 to thereby adjust the first partial CRC value from "A" to the "perspective" of the second data piece "B." The perspective shift in the projection circuit 47 may be implemented by using a shift distance to access one or more distance lookup tables to alter the term enables provided to an XOR logic block so as to cover all possible projections for a given CRC polynomial. By providing a distance lookup table with 1 entry for every possible distance, shifted CRC value (CRC multiplier) can be provided in 1 cycle. And by breaking a large table down into smaller tables, the shifted CRC value can be provided with sequential lookups of multipliers over a fixed number of cycles. Depending on the application requirements, the shifted CRC value can be obtained with one lookup in a 64K deep distance lookup table memory or with 4 lookups in 4 memories that are 16 entries deep, followed by 4 cycles of multiplication. Thereafter, the first and second partial CRC values are retrieved and logically combined with the XOR circuit module 48 to calculate the CRC over the unit of data "D" for storage in a storage, memory, or buffer 49.

For comparison purposes, the second CRC circuit configuration 50 embodies a CRC calculation from a data stream or unit "D" consisting of contiguous pieces "A" 52 and "B" 51 applied to a CRC circuit 53 which calculates the CRC value over the data stream or unit "D" for storage in a storage, memory, or buffer 54. The CRC computational results 49, 54 for the CRC circuit configurations 40, 50 are identical, and can be accomplished without requiring data retrieval from external memory. However, with the first CRC circuit configuration 40, the CRC circuit 45 is not used for additional cycles to process padded zeroes. Instead, the projection circuit 47 processes the results of the results from the CRC circuit 45 with one or more cycles to efficiently adjust the first partial CRC computation over the first data piece 45 to the same "perspective" as the second partial CRC value over "B" 41, thereby reducing the amount of time the CRC circuit 45 ties up the datapath (e.g., interconnect 150).

The design of the projection circuit 47 may be implemented by modeling the effect of shifting zeroes into a secondary CRC circuit (describe above) over a fixed number of cycles corresponding to the length of a second data piece "B" 41. In this example, the general form of the logic function for the projection circuit 47 is:

$$x_{31} = a_{31\_31} \& X_{31} \oplus a_{31\_30} \& X_{30} \oplus \ldots \oplus a_{31\_0} \& X_0$$
$$x_{30} = a_{30\_31} \& X_{31} \oplus a_{30\_30} \& X_{30} \oplus \ldots \oplus a_{30\_0} \& X_0$$
$$\ldots$$
$$x_1 = a_{1\_31} \& X_{31} \oplus a_{1\_30} \& X_{30} \oplus \ldots \oplus a_{1\_0} \& X_0$$
$$x_0 = a_{0\_31} \& X_{31} \oplus a_{0\_30} \& X_{30} \oplus \ldots \oplus a_{0\_0} \& X_0$$

where "a" is a 32×32 matrix of binary values (1 or 0) that cause the corresponding term to be included or not. As will be appreciated, for a different number of appended zeroes (indicating a different change to the perspective), the values in matrix "a" will differ, but the general form of the logic stays the same.

As disclosed herein, the logic function of the projection circuit 47 may be embodied with a hardware circuit having an XOR logic function of the above general form where the values of the matrix "a" are variables passed into the XOR logic function from a matrix value generator that generates the values of the matrix from a numeric value indicating the amount of any potentially required adjustment. In selected example embodiments, this logic function could be generated by logic synthesis tool from an input of the form of a table (or case statement) representing "n" different matrices, where the input is generated by a simulation of the effect of shifting in all the different amounts of "zeroes" corresponding to the "n" different potential adjustments.

Figure 4:
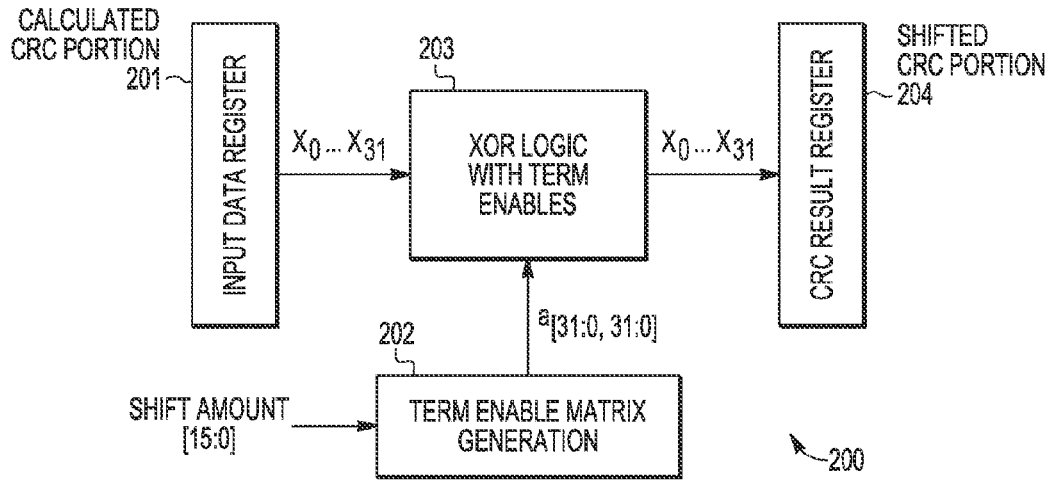
FIG. 4 illustrates a simplified block diagram of a projection circuit to adjust the perspective of one of the computed partial CRC values in a single cycle in accordance with selected embodiments of the present disclosure.

To illustrate selected example embodiments of a projection circuit, reference is now made to FIG. 4 which illustrates a simplified block diagram of a projection circuit 200 which adjusts the perspective of one of the computed partial CRC values in a single cycle. As shown, the projection circuit 200 includes an input data register 201 and term enable matrix generator 202 connected as inputs to programmable XOR logic block 203, and a multi-bit CRC result register 204 which are connected to perform any one of 65,535 different perspective adjustments to a CRC value in a single cycle. In selected embodiments, the input data shift register 201 may be embodied as an input storage, memory, or buffer the receives and holds an unshifted partial CRC value, such as may be calculated by a CRC circuit (e.g., 45) from a first data piece (e.g., "A"). For example, up to a 32-bit CRC value $X_0 \ldots X_{31}$ may be stored in the buffer 201. When embodied as a projection circuit 200 for calculating a perspective shifted 32-bit CRC value $x_0 \ldots x_{31}$, the projection circuit 200 is connected to supply the unshifted 32-bit CRC value $X_0 \ldots X_{31}$ from the input data register 201 to the programmable XOR logic block 203 which includes "Exclusive OR" gates (XOR gates) with term enables to generate the perspective shifted multi-bit CRC output string $x=(x_0 \ldots x_{31})$ that is stored in the multi-bit CRC result register 204. The logic function of the programmable XOR logic block 203 is based upon the applied term enable matrix values $a_{31:0,31:0}$ from the term enable matrix generator 202 which are generated based on the shift amount corresponding to the length of another computed partial CRC value (e.g., "B"). When specified with a 16-bit shift amount input variable [15:0], the logic function provided by the programmable XOR logic block 203 can generate 65,536 different matrices of 1024 bit values, with each matrix corresponding to one of the 65,536 potential values of the 16-bit shift amount input variable. If each adjustment were in increments of 8 bits (1 byte), the projection circuit 200 may be implemented as a single-cycle CRC perspective adjustment circuit to support piecewise CRC calculations where pieces of units were up to 65,535 bytes and an integral number of bytes.

Figure 5:
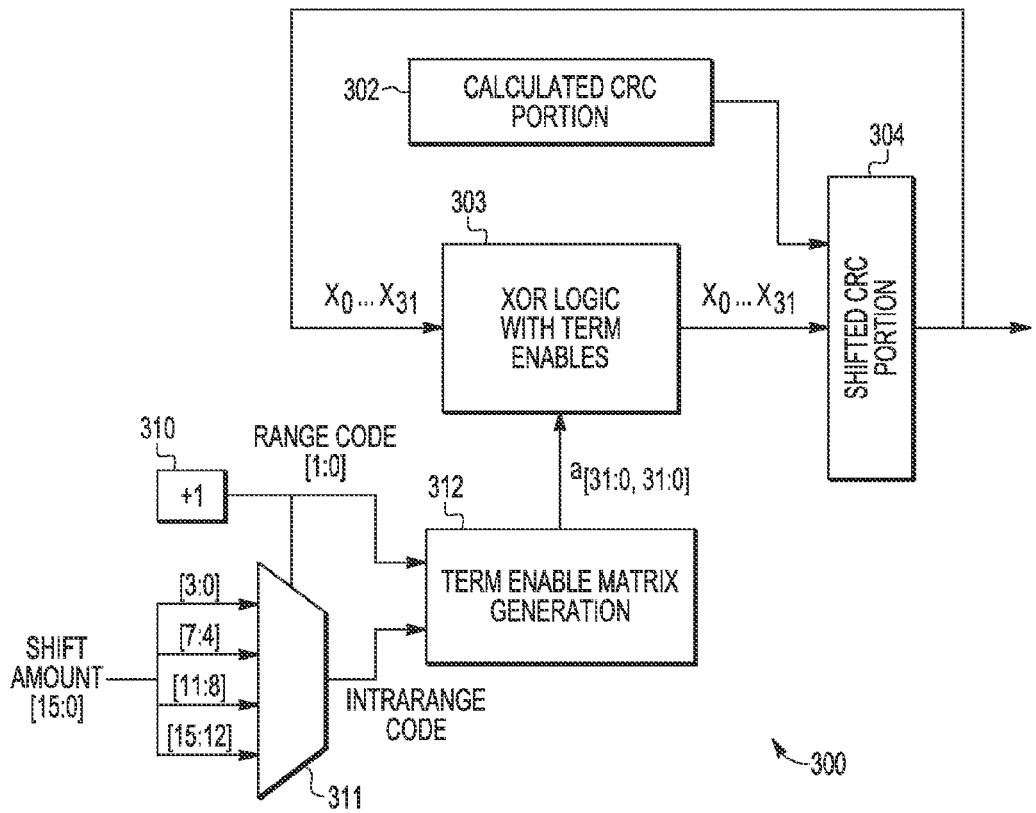
FIG. 5 illustrates a simplified block diagram of a projection circuit to adjust the perspective of one of the computed partial CRC values in a fixed plurality of cycles in accordance with selected embodiments of the present disclosure.

In other embodiments, a projection circuit may be provided which adjusts the perspective of a computed partial CRC value with a fixed number of cycles and smaller memory foot print. For example, FIG. 5 illustrates a simplified block diagram of a projection circuit 300 which adjusts the perspective of one of the computed partial CRC values with a fixed plurality of cycles in accordance with selected embodiments of the present disclosure. As shown, the projection circuit 300 includes programmable XOR logic block 303 and a multi-bit CRC result register 304 connected in a feedback arrangement to provide an input to the XOR logic block 303 which also receives term enable matrix values $a_{31:0,31:0}$ from a term enable matrix generator 312 which are connected to perform any one of 65,535 different perspective adjustments to a CRC value in four cycles. Instead of providing an input data shift register, an unshifted partial CRC value 302, such as may be calculated by a CRC circuit (e.g., 45) from a first data piece (e.g., "A") may be loaded into the multi-bit CRC result register 304. For example, up to a 32-bit CRC value $X_0 \ldots X_{31}$ may be pre-loaded in the result register 304. When embodied as a projection circuit 300 for calculating a perspective shifted 32-bit CRC value $x_0 \ldots x_{31}$, the projection circuit 300 is connected to supply the unshifted 32-bit CRC value $X_0 \ldots X_{31}$, in feedback from the result register 304 to the programmable XOR logic block 303 which includes "Exclusive OR" gates (XOR gates) with term enables to generate the perspective shifted multi-bit CRC output string $x=(x_0 \ldots x_{31})$ that is stored in the multi-bit CRC result register 304. The logic function of the programmable XOR logic block 303 is based upon the applied term enable matrix values $a_{31:0,31:0}$ from the term enable matrix generator 312 which are generated for 16 different values within four different ranges, thereby greatly reducing the matrix generation logic. To control the matrix generation through four cycles, the perspective shift amount is selectively multiplexed in stages to the term enable matrix generator 312 along with corresponding range codes. For example, when the perspective shift amount is specified with a 16-bit shift amount input variable [15:0], a first 4-bit stage or bit range (e.g., [3:0]) from the perspective shift amount may be output from a multiplexer circuit 311 as an intrarange code under control of a 2-bit range code (e.g., 00) generated by a cycle counter 310 which is connected in a feedback configuration. At the next cycle increment, a second 4-bit stage or bit range (e.g., [7:4]) from the perspective shift amount may be output from a multiplexer circuit 311 as the intrarange code under control of the incremented 2-bit range code (e.g., 01) generated by a cycle counter 310, and so on with the third 4-bit stage or bit range (e.g., [11:8]) intrarange code and incremented 2-bit range code (e.g., 10) and then the fourth 4-bit stage or bit range (e.g., [15:12]) intrarange code and incremented 2-bit range code (e.g., 11). As corresponding pairs of range codes and intrarange codes are applied to the term enable matrix generator 312 over the course of four cycles, the logic of the term enable matrix generator is configured to generate 64 different matrices of 1024 bit values, with each matrix corresponding to one of the 16 potential values of the intrarange code within four ranges. In this way, 64K entries can be broken into 4 tables with 16 entries each, such that each table covers the range entry_number*2^(4*table_number), where entry_number is 0-15 and table_number is from 0-3. As shown below, the resulting table 0 holds increments of 1, table 1 holds increments of 16, table 2 holds increments of 256, and table 3 holds increments of 4096:

| Table 0 | Table 1 | Table 2 | Table 3 |
|---------|---------|---------|---------|
| 0 | 0 | 0 | 0 |
| 1 | $16 = 1 \times 2^4$ | $256 = 1 \times 2^8$ | $4096 = 1 \times 2^{12}$ |
| 2 | $32 = 2 \times 2^4$ | $512 = 2 \times 2^8$ | $8192 = 2 \times 2^{12}$ |
| ... | ... | ... | ... |
| 14 | $224 = 14 \times 2^4$ | $3584 = 14 \times 2^8$ | $57344 = 14 \times 2^{12}$ |
| 15 | $240 = 15 \times 2^4$ | $3840 = 15 \times 2^8$ | $61440 = 15 \times 2^{12}$ |

With four cycles to generate 16 different values within each of four ranges, the logic function provided by the programmable XOR logic block 303 can perform any one of 65,535 different perspective adjustments to a CRC value. As will be appreciated, the results of applying each table (e.g., table 0) have to be passed into the next stage as a preload before applying the next table (e.g., table 1).

Figure 6:
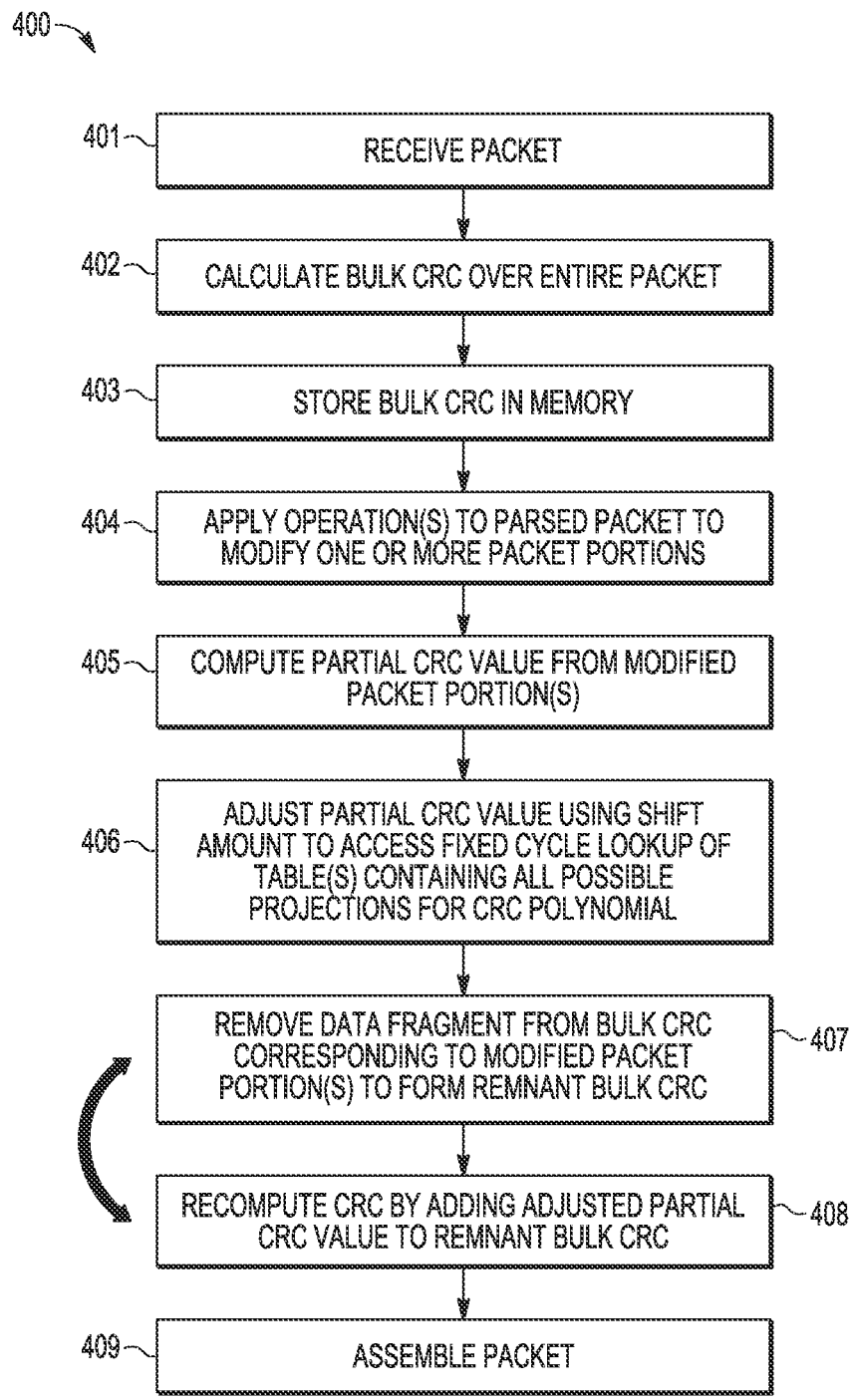
FIG. 6 illustrates a simplified flow chart of a method for regenerating a packet CRC in accordance with selected embodiments of the present disclosure.

FIG. 6 illustrates a simplified flow chart of a method for regenerating a packet CRC at a network device in accordance with selected embodiments of the present disclosure. As an initial or preliminary step, such as in the design stage of an ASIC, for example, the designer determines one or more CRC parameters, such as the maximum packet length for which a multi-bit CRC is to be computed, the size of any CRC value, the packet fields used in the CRC computation, the selection of the CRC polynomial, etc. Using the CRC parameters, one or more distance lookup tables in the projection circuit (e.g., 47) are populated with term enable matrix values $a_{31:0,31:0}$. This may occur when a designer determines the schematic layout of one or more ASIC so to create an accessible distance lookup table or other structure for storing pre-computed term enable matrix values.

In operation, an inbound packet is received (step 401) by a network device or other data forwarding component (e.g., communications processor chip 100) for processing and/or forwarding. Upon receipt of the packet from a physical network interface, a bulk CRC value may be calculated over all or selected parts of the entire packet (step 402), either for purposes of validating the packet or expediting subsequent CRC recalculations as described herein. The bulk CRC value is then copied or stored into an appropriate storage, memory, or buffer (step 403) which is configured to enable one or more portions of the bulk CRC value to be retrieved. In selected example embodiments, the bulk CRC value is stored in predetermined data registers of the CRC hardware unit (e.g., 110). As will be appreciated, steps 401 and 402 may occur at the same time as precursor steps to selected embodiments of the present disclosure.

Assuming that the received packet is validated by the computed bulk CRC value, the network device applies one or more operations to the packet (step 404) that may modify one or more portions of the packet. For example, the network device may implement a router function to modify an MPLS label stack of the packet or any information within the packet header, e.g., when operating as a proxy for a destination of the packet.

If no portion of the packet has been modified, then there is no CRC re-computation required. However, if one or more portions of the packet are modified, then an updated CRC for the packet may be efficiently computed based on the original CRC and modified portions of the packet by employing an efficient piece-wise CRC calculation methodology which computes a perspective-shifted partial CRC value from the modified packet portion(s), starting by first computing a partial CRC value from the modified packet portion(s) (step 405). In selected embodiments, the computation of the partial CRC value may be implemented by XORing the new data portion with the original data portion to produce the modified packet portion, and then applying the modified packet portion (e.g., A') to a serial or parallel CRC circuit (e.g., 110) which calculates the first partial CRC value over A' for storage in a storage, memory, or buffer. Next, the partial CRC value is adjusted or shifted (step 406) using a shift amount to access a fixed cycle lookup of one or more distance tables which contain all possible projections for the applied CRC polynomial. Instead of actually performing unique alterations, the adjustment function at step 406 may use distance lookup table(s) of functions to provide term enable values to alter the perspective over all possible projections (up to a preset maximum) for a given polynomial, thereby simulating the effective CRC contribution of a data fragment that is shifted from the end of the packet by the shift amount.

Once the adjusted partial CRC value is computed, the data fragment corresponding to the modified packet portion(s) may be removed from the bulk CRC value (step 407) to form a remnant bulk CRC value (step 407). In selected embodiments, the removal of the data fragment from the bulk CRC value may be implemented by taking the result derived from the adjustment function (step 406) and applying (XORing) it to the original bulk CRC value. In selected embodiments, the recomputed CRC value may be implemented to add the adjusted partial CRC value as a data fragment by directly applying (XORing) the generated result to the bulk CRC value or remnant CRC value computed at step 407. Though step 407—removing the projected CRC from the segment to be removed—is shown as occurring before step 408, these steps can be done concurrently or in series, and the order is not important so that either step 407 or 408 can be done first, as indicated by the two-sided arrow. Either way, the inverted version of the projected CRC of the segment to be removed (e.g., A) and the projected version of the new segment (e.g., A') are XORed into the original bulk CRC value.

Finally, the recomputed CRC value and modified packet containing the modified packet portion(s) are provided as inputs to packet assembly circuitry (step 409) in order to produce a new packet in which the recomputed CRC value replaces the original CRC value at the end of the new packet. Once assembled, the new packet may be forwarded out to a network link or to another destination in the network device.

As seen from the foregoing, the polynomial specific adjustment function requires the partial CRC value of a data fragment, a shift amount specifying the forward distance to traverse, and the original bulk CRC value. By using distance lookup tables to shift the perspective of a partial CRC data fragment in a fixed number of cycles (e.g., 1 or 4), depending on the design requirements, the CRC value of a modified data packet can be generated in a manner that avoids complete CRC recalculation based on the entire packet after only a portion of the packet has been modified.

With the disclosed approach, an original frame T={A,B,C} is received and a bulk CRC value for the original frame is calculated as CRC(T). In the event that a portion of the original frame T (e.g., portion B) is modified or replaced (e.g., with portion D) to generate a new frame (e.g., T2={A,D,C}), a new CRC for the new frame T2 may be efficiently calculated without recalculating a complete CRC value based on an entirety of frame T2. In selected embodiments, this CRC calculation first calculates a CRC value for portion B=CRC(B) and projects the value using the distance lookup table(s) to obtain a first projected CRC value, CRC(B)$_{PROJECTED}$. The disclosed CRC calculation also calculates a CRC value for portion D=CRC(D) and projects the value using the distance lookup table(s) to obtain a second projected CRC value, CRC(D)$_{PROJECTED}$. As a result, the new CRC for frame T2, CRC(T2) may be computed by XORing the bulk CRC value with the first and second projected CRC values. In other words, CRC(T2)= CRC(T)$\oplus$CRC(B)$_{PROJECTED}\oplus$CRC(D)$_{PROJECTED}$.

In accordance with the present disclosure, other approaches may be used to efficiently calculate a new CRC for frame T2={A,D,C} which is modified with reference to an original frame T={A,B,C} for which a bulk CRC value CRC(T) has been computed without requiring recalculation of a complete CRC value based on an entirety of frame T2. One example approach is to identified the changes between the portion B and portion D, such as by computing a change value E=B$\oplus$D. Next, a CRC value for data change value E=CRC(E) is computed and projected using the distance lookup table(s) to obtain a projected CRC value, CRC(E)$_{PROJECTED}$. Lastly, the new CRC for frame T2, CRC(T2) may be computed by XORing the bulk CRC value with the projected CRC value. In other words, CRC(T2)= CRC(T)$\oplus$CRC(E)$_{PROJECTED}$. With this approach, one of the CRC calculation and projection steps is eliminated, and there is no requirement for adding an adjusted partial CRC value to the remnant bulk CRC value (such as described in step 408).

By now it should be appreciated that there is provided herein a network device and associated method of operation. In the disclosed methodology, a packet is received from a network over a one or more network interfaces. As received, the packet includes an original data stream with an original data unit and one or more additional data units extending to the end of the original data stream, and an original cyclical redundancy check (CRC) value computed from the original data stream. From the original data stream, a modified data unit is inserted into the packet in place of the original data unit to generate modified data stream. In addition, a first CRC value is generated or computed from the one or more additional data units, such as by computing a remainder of a CRC polynomial division of the one or more additional data units. In addition, a second CRC value is generated or computed from the modified data unit, such as by computing the second CRC value comprises computing a remainder of a CRC polynomial division of the modified data unit. The second CRC value may then be adjusted based on a shift length equal to a distance of the one or more additional data units to generate or compute a perspective shifted second CRC value by using fixed number of distance lookup table operations. In selected embodiments, the second CRC value may be adjusted by accessing a single distance lookup table with the shift length to a generate a matrix of term enable values, and the applying the matrix of term enable values to an XOR logic circuit to generate the perspective shifted second CRC value, thereby generating the perspective shifted second CRC value using a single distance lookup table operation. In selected embodiments, the second CRC value may be adjusted by sequentially accessing four distance lookup tables with sequential portions of the shift length to a generate a matrix of term enable values, and the applying the matrix of term enable values to an XOR logic circuit to compute the perspective shifted second CRC value, thereby generating the perspective shifted second CRC value using four distance lookup table operations. Subsequently, an updated CRC value is generated from the first CRC value and perspective shifted second CRC value, thereby avoiding recalculating a complete CRC value based on an entirety of the modified data stream. In selected embodiments, the updated CRC value may be generated by applying the perspective shifted second CRC value to the original CRC value with an XOR operation. The disclosed methodology may also include generating or computing a third CRC value from the original data unit, and then adjusting the third CRC value based on a shift length equal to a distance of the one or more additional data units to compute a perspective shifted third CRC value by using fixed number of distance lookup table operations. In such embodiments, the contribution of the original data unit may be removed from the original CRC value by applying an inverse of the perspective shifted third CRC value to the original CRC value with an XOR operation.

In another form, there is provided a network device and associated method of operation. The disclosed network device may include CRC offload hardware circuitry and a memory that stores a packet comprising a data stream with a first data unit and one or more additional data units extending to the end of the data stream. The network device may also include one or more network interfaces for receiving an original packet which is stored in the memory to include an original data stream with an original data unit and one or more additional data units extending to the end of the original data stream, and an original cyclical redundancy check (CRC) value computed from the original data stream. The CRC offload hardware circuitry may include first CRC computation circuitry that produces a first CRC value from the first data unit using circuitry for computing a remainder of a CRC polynomial division of the first data unit. The CRC offload circuitry may also include second CRC computation circuitry that produces a second CRC value from the one or more additional data units with circuitry for computing a remainder of a CRC polynomial division of the one or more additional data units. The CRC offload circuitry may also include projection circuitry configured to adjust the first CRC value based on a shift length equal to a distance of the one or more additional data units to compute a perspective shifted first CRC value by using fixed number of distance lookup table operations. In selected embodiments, the projection circuitry may include a distance lookup table for generating a matrix of term enable values in response to the shift length, and an XOR logic circuit connected to receive the first CRC value and the matrix of term enable values to compute the perspective shifted first CRC value by using a single distance lookup table operation. In selected embodiments, the projection circuitry may include a plurality of distance lookup tables, each for generating a matrix of term enable values in response to sequential portions of the shift length; and an XOR logic circuit connected to receive the first CRC value and the matrix of term enable values to compute the perspective shifted first CRC value by using a fixed number of distance lookup table operations. The CRC offload circuitry may also include XOR logic for combining perspective shifted first CRC value and second CRC value to generate a CRC value for the data stream, thereby avoiding recalculating a complete CRC value based on an entirety of the data stream. The network device may also include third CRC computation circuitry that produces a third CRC value from the original data unit, and projection circuitry configured to adjust the third CRC value based on a shift length equal to a distance of the one or more additional data units to compute a perspective shifted third CRC value by using fixed number of distance lookup table operations. In such embodiments, the XOR logic may be configured to remove a contribution from the original data unit to an original CRC value by applying an inverse of the perspective shifted third CRC value to the original CRC value with an XOR operation. In selected embodiments, the network device may include processing circuitry for generating the data stream by inserting the first data unit into the packet in place of an original data unit, the processing circuitry being in electrical communication with the memory and CRC offload hardware circuitry. In addition, the network device may include a forwarding component that updates the data stream with the CRC value and outputs the packet to a network via one or more network interfaces. Instead of using software, Layer 1 or Layer 2 operations of a network communications protocol may be performed using the disclosed CRC offload hardware circuitry which includes one or more distance lookup tables for storing pre-computed term enable values that are loaded into gates of an XOR logic circuit in response to the shift length to compute the perspective shifted first CRC value by using a fixed number of distance lookup table operations.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified block diagrams and flow charts illustrating design and operational details of a communication processor with associated hardware devices for processing network frames without including every device feature or aspect in order to avoid limiting or obscuring the present invention. Such descriptions and representations are used by those skilled in the art to describe and convey the substance of their work to others skilled in the art, and the omitted details which are well known are not considered necessary to teach one skilled in the art of how to make or use the present invention. Some portions of the detailed descriptions provided herein are also presented in terms of algorithms and instructions that operate on data that is stored in a computer memory. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of hardware or a computer system or a similar electronic computing device, that manipulates and transforms data represented as physical (electronic) quantities within registers and memories into other data similarly represented as physical quantities within the memories or registers or other such information storage, transmission or display devices.

Although the described exemplary embodiments disclosed herein are directed to various CRC computation circuitry and method for using distance lookup tables to shift the perspective of CRC data fragments in order to efficiently perform CRC re-computation, the present invention is not necessarily limited to the example embodiments which illustrate inventive aspects of the present invention that are applicable to a wide variety of hardware, software, firmware, and/or microcode arrangements that may be used in order to perform the CRC re-computation. Thus, the particular embodiments disclosed above are illustrative only and should not be taken as limitations upon the present invention, as the invention may be modified and practiced in different but equivalent manners apparent to those skilled in the art having the benefit of the teachings herein. For example, although FIG. 1 and the discussion thereof describe an exemplary communications processor chip, the illustrated architecture is presented merely to provide a useful reference in discussing various aspects of the invention, and is not intended to be limiting so that persons of skill in the art will understand that the principles taught herein apply to other types of devices. For example, the communication processor chip 100 may operate according to executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. The functions of the communication processor chip 100 may be implemented by executing the instructions of the computer-readable medium with one or more processors, discrete hardware circuitry, firmware, software executing on a programmable processor, or a combination of any of the above. Furthermore, those skilled in the art will recognize that boundaries between the functionality of the above described operations merely illustrative. The functionality of multiple operations may be combined into a single operation, and/or the functionality of a single operation may be distributed in additional operations.

Moreover, alternative embodiments may include multiple instances of a particular operation, and the order of operations may be altered in various other embodiments. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. In addition, the term "coupled," as used herein, is not intended to be limited to a direct coupling or a mechanical coupling. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
   receiving a packet from a network over one or more network interfaces, wherein the packet comprises:
      an original data stream with an original data unit and one or more additional data units extending a first distance to the end of the original data stream, and
      an original cyclical redundancy check (CRC) value computed from the original data stream;
   inserting a modified data unit into the packet in place of the original data unit to generate a modified data stream;
   generating a first CRC value from the one or more additional data units;
   generating a second CRC value from the modified data unit;
   generating a perspective-shifted second CRC value from the second CRC value by adjusting the second CRC value based on a shift length equal to the first distance of the one or more additional data units using a fixed number of distance lookup table operations to access a term enable matrix generation lookup table containing all possible projections for a specified CRC polynomial; and
   generating an updated CRC value from the first CRC value and perspective shifted second CRC value, thereby avoiding recalculating a complete CRC value based on an entirety of the modified data stream.

2. The method of claim 1, where generating the first CRC value comprises computing a remainder of a CRC polynomial division of the one or more additional data units.

3. The method of claim 1, where generating the second CRC value comprises computing a remainder of a CRC polynomial division of the modified data unit.

4. The method of claim 1, where adjusting the second CRC value comprises:
accessing a single distance lookup table with the shift length to a generate a matrix of term enable values; and
applying the matrix of term enable values to an XOR logic circuit to compute the perspective shifted second CRC value, thereby generating the perspective shifted second CRC value using a single distance lookup table operation.

5. The method of claim 1, where adjusting the second CRC value comprises:
sequentially accessing n distance lookup tables with sequential portions of the shift length to a generate a matrix of term enable values; and
applying the matrix of term enable values to an XOR logic circuit to compute the perspective shifted second CRC value, thereby generating the perspective shifted second CRC value using n distance lookup table operations, where n is a power of 2.

6. The method of claim 1, further comprising:
generating a third CRC value from the original data unit;
adjusting the third CRC value based on a shift length equal to the first distance of the one or more additional data units to compute a perspective shifted third CRC value by using the fixed number of distance lookup table operations.

7. The method of claim 6, further comprising removing a contribution of the original data unit from the original CRC value by applying an inverse of the perspective shifted third CRC value to the original CRC value with an XOR operation.

8. The method of claim 1, where generating the updated CRC value comprises applying the perspective shifted second CRC value to the original CRC value with an XOR operation.

9. A network device comprising:
a memory that stores a packet comprising a data stream with a first data unit and one or more additional data units extending a first distance to the end of the data stream; and
CRC offload hardware circuitry comprising:
first CRC computation circuitry that produces a first CRC value from the first data unit,
projection circuitry configured to adjust the first CRC value based on a shift length equal to the first distance of the one or more additional data units to compute a perspective shifted first CRC value from the first CRC value by using a fixed number of distance lookup table operations to access a term enable matrix generation lookup table containing all possible projections for a specified CRC polynomial,
second CRC computation circuitry that produces a second CRC value from the one or more additional data units, and
XOR logic for combining the perspective shifted first CRC value and the second CRC value to generate a CRC value for the data stream, thereby avoiding recalculating a complete CRC value based on an entirety of the data stream.

10. The network device of claim 9, further comprising processing circuitry for generating the data stream by inserting the first data unit into the packet in place of an original data unit, the processing circuitry being in electrical communication with the memory and the CRC offload hardware circuitry.

11. The network device of claim 9, further comprising a forwarding component that updates the data stream with the CRC value and outputs the packet to a network via one or more network interfaces.

12. The network device of claim 9, where the first CRC computation circuitry comprises circuitry for computing a remainder of a CRC polynomial division of the first data unit.

13. The network device of claim 9, where the second CRC computation circuitry comprises circuitry for computing a remainder of a CRC polynomial division of the one or more additional data units.

14. The network device of claim 9, where the projection circuitry comprises:
a distance lookup table for generating a matrix of term enable values in response to the shift length; and
a second XOR logic circuit connected to receive the first CRC value and the matrix of term enable values to compute the perspective shifted first CRC value by using a single distance lookup table operation.

15. The network device of claim 9, where the projection circuitry comprises:
a plurality of distance lookup tables, each for generating a matrix of term enable values in response to sequential portions of the shift length; and
a second XOR logic circuit connected to receive the first CRC value and the matrix of term enable values to compute the perspective shifted first CRC value by using the fixed number of distance lookup table operations.

16. The network device of claim 10, further comprising:
third CRC computation circuitry that produces a third CRC value from the original data unit, and
additional projection circuitry configured to adjust the third CRC value based on the shift length equal to the first distance of the one or more additional data units to compute a perspective shifted third CRC value from the third CRC value by using the fixed number of distance lookup table operations.

17. The network device of claim 16, where the XOR logic is configured to remove a contribution from the original data unit to an original CRC value by applying an inverse of the perspective shifted third CRC value to the original CRC value with an XOR operation.

18. The network device of claim 9, where CRC offload hardware circuitry performs Layer 1 or Layer 2 operations of a network communications protocol.

19. The network device of claim 16, where the additional projection circuitry comprises one or more distance lookup tables for storing pre-computed term enable values that are loaded into gates of a third XOR logic circuit in response to the shift length to compute the perspective shifted third CRC value by using the fixed number of distance lookup table operations.

20. The network device of claim 9, further comprising one or more network interfaces for receiving an original packet;
wherein the memory stores the original packet comprising:
an original data stream with an original data unit and one or more additional data units extending to the end of the original data stream, and
an original cyclical redundancy check (CRC) value computed from the original data stream.

* * * * *